United States Patent [19]

Van Buren

[11] 4,453,238

[45] Jun. 5, 1984

[54] APPARATUS AND METHOD FOR DETERMINING THE PHASE SENSITIVITY OF HYDROPHONES

[75] Inventor: Arnie L. Van Buren, Orlando, Fla.

[73] Assignee: The United States of America as represented by the Secretary of the Navy, Washington, D.C.

[21] Appl. No.: 368,793

[22] Filed: Apr. 15, 1982

[51] Int. Cl.³ .............................................. H04R 29/00
[52] U.S. Cl. ..................................... 367/13; 73/1 DV
[58] Field of Search .......................... 367/13; 73/1 DV

[56] References Cited

U.S. PATENT DOCUMENTS 4,090,169 5/1978 Adair et al. ........................... 367/13

OTHER PUBLICATIONS

R. J. Bobber, *Underwater Electroacoustic Measurements*, Naval Research Lab. 1970, (pp. 28-30).

*Primary Examiner*—Richard A. Farley
*Attorney, Agent, or Firm*—Robert F. Beers; William T. Ellis; Alan P. Klein

[57] ABSTRACT

A method and apparatus for determining the phase angle of the sensitivity of a hydrophone H to be calibrated. The method comprises positioning in a straight line a transducer P, the hydrophone H, and a reciprocal transducer T that can be used both as a hydrophone and a projector; determining the phase angles of a set of voltages and currents; and finding the phase angle of the sensitivity from the former phase angles. The apparatus includes a framework for positioning P, H and T in a straight line, an electronic system for monitoring the voltages and currents, and a programmed computer for performing a single-point DFT.

10 Claims, 7 Drawing Figures

APPARATUS AND METHOD FOR DETERMINING THE PHASE SENSITIVITY OF HYDROPHONES

This invention relates generally to hydrophones, and more particularly to systems for obtaining a frequency-calibration of a hydrophone.

It is known to use electroacoustic transducers to sense underwater sounds and to produce them as controlled signals. When the transducer is used to sense underwater sounds, it is referred to as a "hydrophone"; when it is used to produce or transmit underwater sounds it is referred to as a "projector". Electrical and acoustical measurements are required to calibrate, test or evaluate underwater electroacoustic transducers and to enable one, indirectly, to produce or detect and measure an underwater acoustic signal, usually in terms of its acoustic pressure. The end result of most measurements is the value of an electroacoustic parameter; that is, a ratio of an electrical variable to an acoustical one, or the inverse. Typically, the receiving sensitivity (voltage/pressure) or the transmitting response (pressure/current or pressure/voltage) is the electroacoustic parameter computed from measured electrical data and various constants. When the receiving sensitivity (or transmitting response) is measured as a function of frequency, one obtains a frequency calibration of the transducer.

Although the receiving sensitivity as a function of frequency is often treated as only an amplitude, it also includes a phase angle. Unless the frequency of measurement is well below the lowest hydrophone resonance, the phase angle of the receiving sensitivity varies considerably (and monlinearly) with frequency. The time waveform of the acoustic pressure of an underwater acoustic signal being detected can only be recovered if the phase shifts for each frequency component of the receiving sensitivity are known. Heretofore, calibration of hydrophones rarely involved the phase angle because of experimental difficulties encountered in its determination when the frequency is not low. One such difficulty is accurately determining the distance between transducers used in the calibration. A very small distance error at higher frequencies can produce a relatively large phase error. Another difficulty encountered is accurately determining the sound speed in the measurement medium. Small errors in sound speed can also lead to large phase errors.

Prior art methods of hydrophone calibration are discussed in the text *Underwater Electroacoustic Measurements* by Robert J. Bobber (1970), especially at pages 28–30.

SUMMARY OF THE INVENTION

It is therefore an object of this invention to obtain a hydrophone frequency calibration which includes measurement of the phase angle.

Another object is to eliminate errors in the phase angle measurement.

These and other objects of the present invention are achieved by a system for obtaining a frequency calibration of a hydrophone H, wherein the hydrophone H is positioned together with a projector P and a reciprocal transducer T along a straight line in a substantially free-field water medium. The hydrophone H is positioned so that it lies between the projector P and the reciprocal transducer T, and the projector P and reciprocal transducer T both face the hydrophone H. The output voltage $e_{PH}$ of the hydrophone H is measured with the projector being driven by an input current $i_p$ at a desired frequency $f = \omega/2\pi$; the output voltage $e_{PT}$ of the reciprocal transducer T is measured with the hydrophone H removed and the projector being driven by the input current $i_p$ at the desired frequency $f = \omega/2\pi$; the output voltage $e_{TH}$ of the hydrophone H is measured with the hydrophone H replaced and the reciprocal transducer T being driven by an input current $i_T$ at the desired frequency $f = \omega/2\pi$; and the input current $i_T$ is measured. Next, the amplitude and phase angle of the components of the measured output voltages and input current at the desired frequency $f = \omega/2\pi$ are determined, after which the amplitude and phase angle of the receiving sensitivity $M_H$ of the hydrophone H at the desired frequency $f = \omega/2\pi$ are calculated by substitution in the expression $$M_H = [(4\pi e_{PH} e_{TH} d_1 d_3)/(j\omega \rho e_{PT} i_T d_2)]^{\frac{1}{2}}$$

wherein
$j = \sqrt{-1}$
$\rho$ = the density of the water medium;
$d_1$ = the distance between the projector P and the hydrophone H;
$d_2$ = the distance between the projector P and the reciprocal transducer T; and
$d_3$ = the distance between the hydrophone H and the reciprocal transducer T.

Use of the novel in-line configuration of hydrophone, projector and reciprocal transducer, with a corresponding measurement procedure eliminates potential phase error due to experimental uncertainty in both measurement distances and sound speed. This allows the accurate determination of the phase angle of the receiving sensitivity of the hydrophone, even at high frequencies where potential phase errors would likely prevent accurate results using previous methods.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENT

Figure 1:
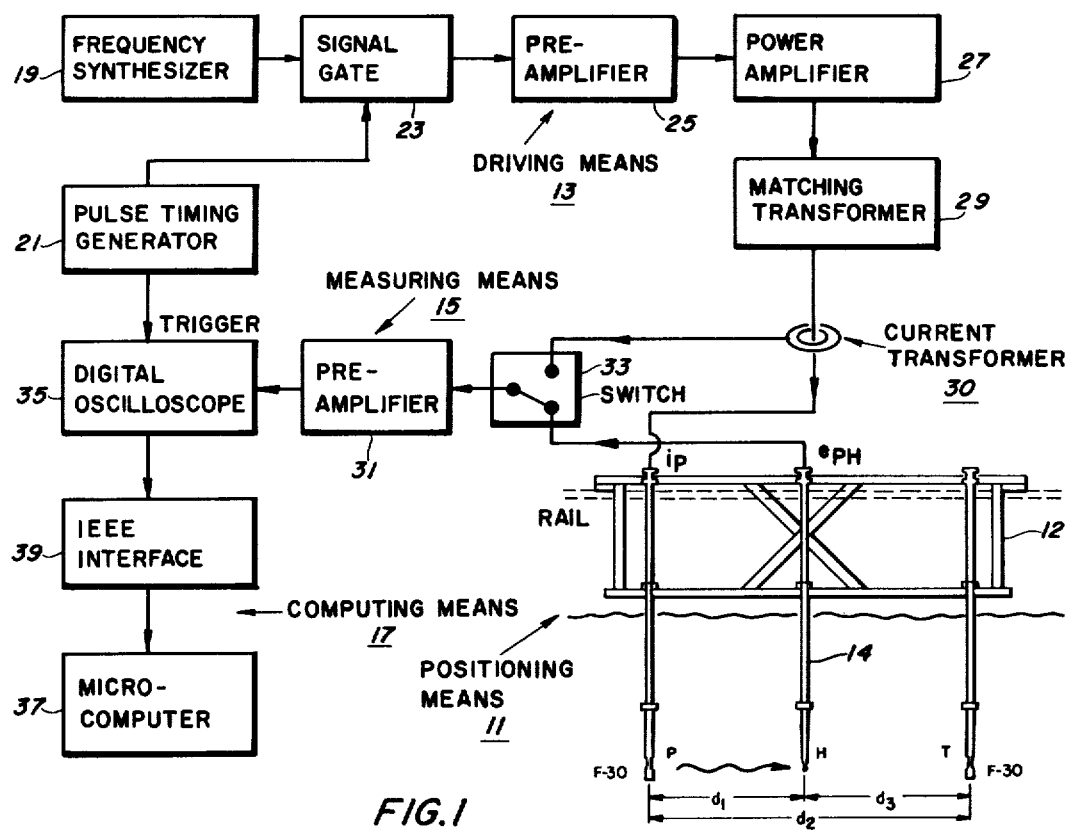
FIGS. 1–4 are block diagrams of an embodiment of the frequency-calibration apparatus of the invention.

Referring now to the drawing, wherein like reference numerals designate identical or corresponding parts throughout the several views and more particularly to FIG. 1 thereof, there is shown an apparatus for obtaining a frequency-calibration of a hydrophone H. The apparatus includes a positioning means 11 for positioning the hydrophone H together with a projector P and a reciprocal electroacoustic transducer T along a straight line in a substantially free-field water medium, so that the hydrophone H lies between the projector P and the reciprocal transducer T within their farfields, and the projector P and reciprocal transducer T both face the hydrophone H. The term "reciprocal transducer" is used herein in its conventional sense to denote a transducer for which the ratio of receiving sensitivity to transmitting response is a constant depending only on the acoustic medium, the frequency and the boundary conditions. Most known conventional transducers (i.e., piezoelectric, piezoceramic, magnetostrictive, moving-coil, etc.) are reciprocal at nominal signal levels. By "free-field" water medium is meant a homogeneous isotropic water medium free from boundaries, and may be, for example, a natural body of water.

Figure 2:
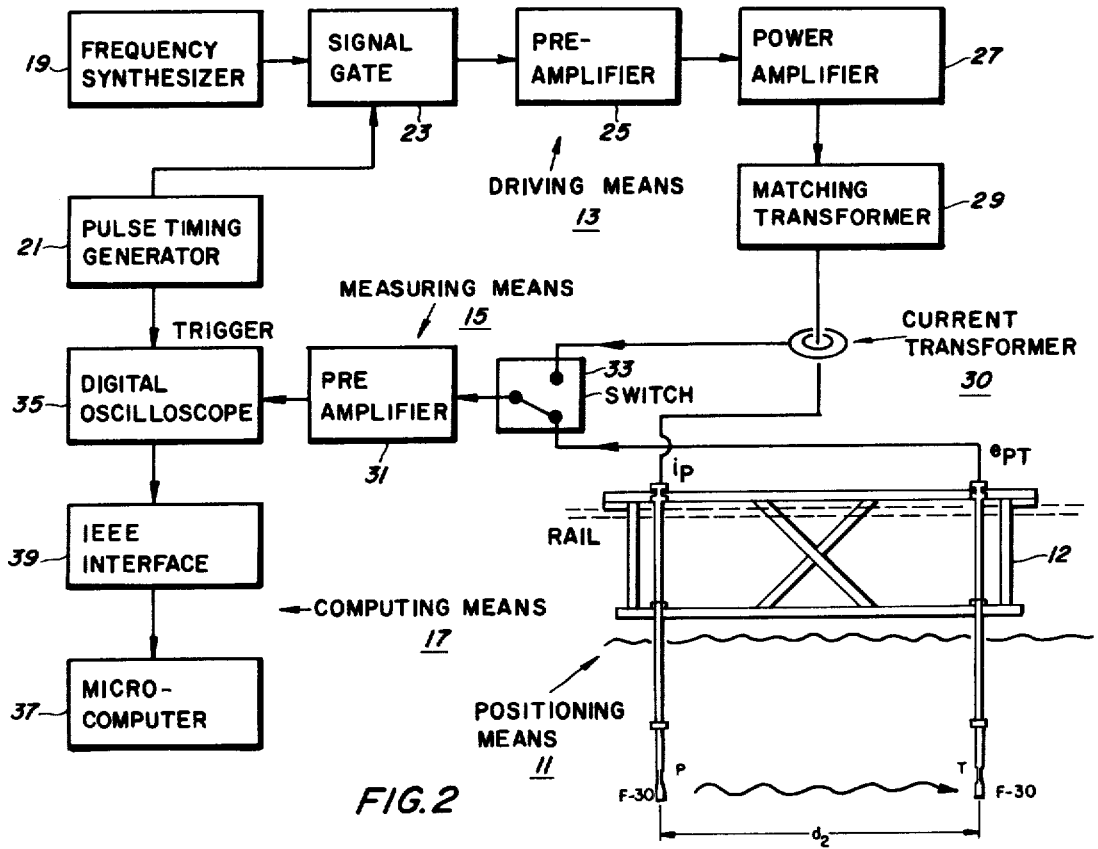

While the positioning means may take a variety of forms, conveniently it may take the form illustrated in FIG. 1 of a framework 12 having for the hydrophone H a mounting hanger 14 designed so that it can be easily rotated or removed from the framework as desired (FIG. 2 shows a configuration wherein the hydrophone H has been removed from the framework 13). A suitable transducer for both P and T is the USRD type F30 transducer described in Naval Research Laboratory Memorandum Report No. 7735 by I. D. Groves, entitled "Twenty Years of Underwater Electroacoustic Standards", the disclosure of which is hereby incorporated by reference. The F30 transducer is a piston-type transducer with an active rectangular area about 5.0×3.8 cm that is designed to operate over a frequency range from 10 to 150 kHz. If the distance $d_1$ between the hydrophone H and the projector P, and the distance $d_3$ between the hydrophone H and the reciprocal transducer T are both nominally equal to 1 m, the hydrophone H will be well within the sound farfield of either F-30 transducer at frequencies up to 150 kHz (i.e., it will intercept segments of the projected spherical waves that are small enough, or that have radii of curvature large enough, to be indistinguishable from plane waves).

The remainder of the calibration apparatus is made up of a driving means 13 which is adapted to be coupled to the input of either the projector P (FIGS. 1 and 2) or the reciprocal transducer T (FIGS. 3 and 4); a measuring means 15 which is adapted to be coupled to the output of either the hydrophone H (FIGS. 1 and 3), the reciprocal transducer T (FIG. 2), or the driving means 13; and a computing means 17 which is connected to the output of the measuring means 15.

Figure 3:
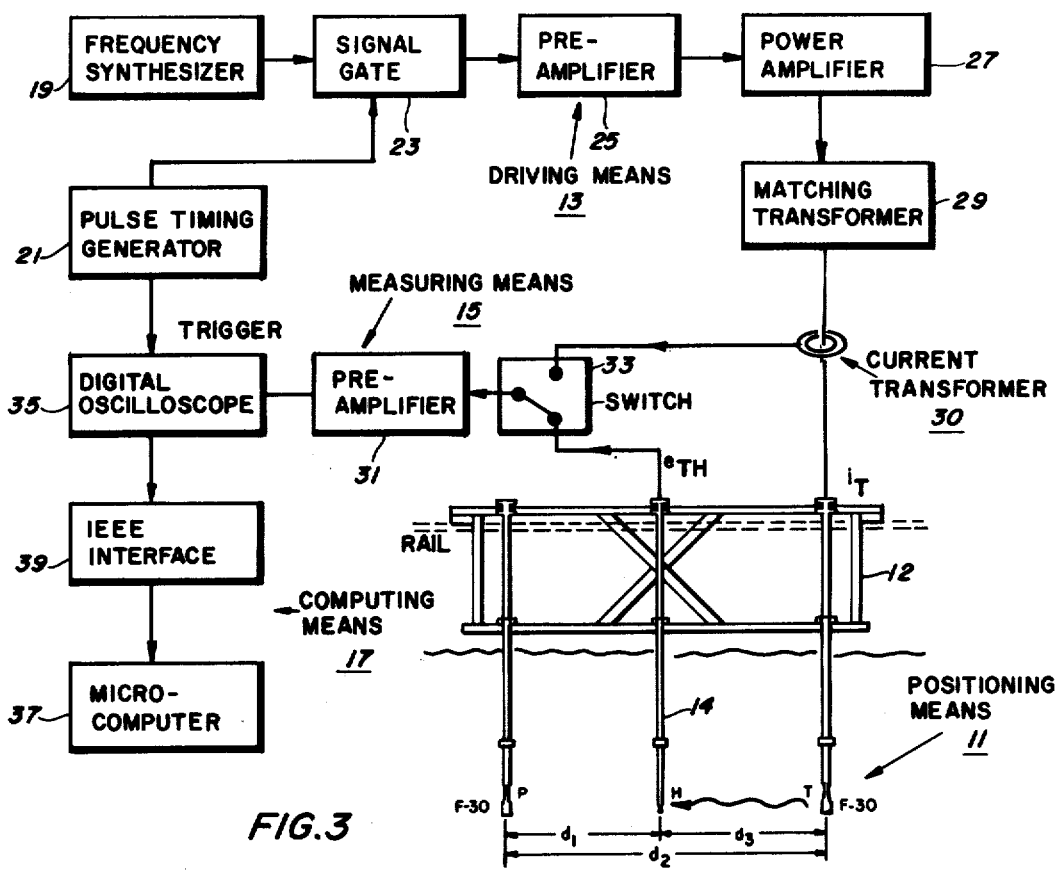
Figure 4:
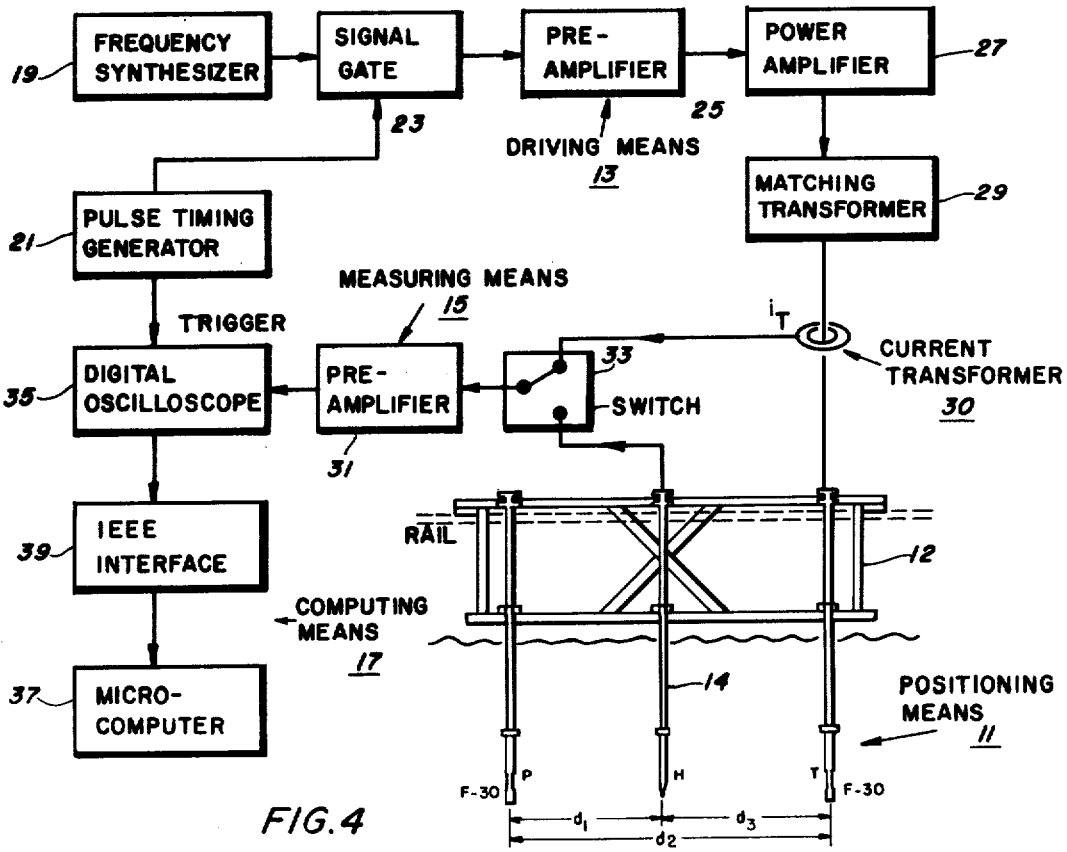

The driving means 13 is provided to drive the projector P by an input current $i_p$ at a desired frequency $f=\omega/2\pi$ (FIGS. 1 and 2) and alternatively to drive the reciprocal transducer T by another input current $i_T$ at the desired frequency $f=\omega/2\pi$ (FIGS. 3 and 4). While the driving means 13 may take a variety of forms, conveniently it may take the form illustrated in FIGS. 1-4 of a frequency synthesizer 14, such as a Hewlett-Packard model 3320A; a pulse timing generator 21, such as a Scientific-Atlanta Inc. model 1118; a signal gate 23 such as Scientific-Atlanta Inc. model 1111, connected to the frequency synthesizer 19 and to the pulse timing generator 21; a preamplifier 25, such as an H. H. Scott Inc. model 140B, connected to the signal gate 23; a power amplifier 27, such as a Krohn-Hite Corp. model DCA 50(R), connected to the preamplifier 25; and an impedance matching transformer 29, such as a Krohn-Hite Corp model MT 50 whose input is connected to the power amplifier 27, and whose output is adapted to be connected to the input of the projector P (FIGS. 1 and 2), or the reciprocal transducer T (FIGS. 3 and 4).

The measuring means 15 is employed to measure the output voltage $e_{PH}$ of the hydrophone H with the projector P being driven by the input current $i_P$(FIG. 1); to measure the output voltage $e_{PT}$ of the reciprocal transducer T with the hydrophone H removed from the framework 12 and with the projector P being driven by the input current $i_P$ (FIG. 2); to measure the output voltage $e_{TH}$ of the hydrophone H with the latter in place in the framework 13 and the reciprocal transducer T being driven by the input current $i_T$ (FIG. 3); and to measure the input current $i_T$(FIG. 4). The input current and voltage values are complex; i.e., they include both amplitude and phase. While the measuring means 15 may take a variety of forms, convenienty it may take the form illustrated in FIGS. 1-4 of a current transformer 30, such as a Pearson Electronics Inc. model 110, connected to the driving means 13; a preamplifier 31, such as a Scientific-Atlanta Inc. model 1116; a single pole-double throw switch 33 connecting the input of the preamplifier 31 to either the current transformer 29 (FIG. 4) or to one or the other of the hydrophone H (FIGS. 1 and 3) and the reciprocal transducer T (FIG. 2); and a digital oscilloscope 35, such as a Nicolet Instrument Corporation model 2090 III, connected to the output of the preamplifier 31 and to the pulse timing generator 21.

The computing means 17 determines the amplitude and phase angle of the components of the measured output voltages and input current at the desired frequency $f=\omega/2\pi$, and calculates the amplitude and phase angle of the receiving sensitivity $M_H$ of the hydrophone at the desired frequency $f=\omega/2\pi$ by substituting their values into the expression $$M_H = [(4\pi e_{PH} e_{TH} d_1 d_3)/(j\omega \rho e_{PT} i_T d_2)]^{\frac{1}{2}}$$

wherein:

$j = \sqrt{-1}$;

$\rho$ = the density of the water medium; and $d_2$ = the distance between the projector P and the reciprocal transducer T.

While the computing means 17 may take a variety of forms, conveniently it may take the form illustrated in FIGS. 1-4 of a microcomputer 37, such as a Hewlett-Packard model 9835, connected to the measuring means 15 by a suitable IEEE interface 39, such as a Hewlett-Packard model HB-IB 98034A.

Now, the operation of the frequency-calibration apparatus will be described. Referring to FIG. 1, the hydrophone H and its hanger 14 are placed in the framework 12 and positioned so that the hydrophone H faces towards the projector P. A continuous wave signal at a desired frequency $f=\omega/2\pi$ is generated by the frequency synthesizer 19 and fed to the signal gate 23 which converts the continuous wave signal into a pulsed sinusoid in response to timing signals from the pulse timing generator 21. The duration of each pulse is about 1 millisecond long and the time between pulses about 100 milliseconds, or long enough for reflections to die down between pulses. The pulsed sinusoid is amplified first by the preamplifier 25, and then by the power amplifier 27. The amplified signal is applied to the projector P by way of the impedance matching transformer 29 to drive the projector P by an input current $i_P$ at the desired frequency $f=\omega/2\pi$.

The output voltage $e_{PH}$ produced by the hydrophone H with the projector P being driven by the input current $i_P$ is fed by way of the switch 33 to the preamplifier 31 for amplification. The amplified voltage waveform is then digitized by the digital oscilloscope 35 to provide a measurement of the output voltage $e_{PH}$. The digital oscilloscope 35 is triggered by the pulse timing generator 21 at a time corresponding to the arrival of the sound wave at the hydrophone H, i.e., the trigger is delayed from the time that the pulse is applied to the projector. The digitized signal is transferred by way of the IEEE interface 39 to the microcomputer 37.

Next, referring to FIG. 2, the hydrophone H and its hanger 14 are removed from the framework 12 and the output voltage $e_{PT}$ produced by the reciprocal transducer T with the projector P being driven by the input current $i_P$ is fed by way of the switch 33 to the preamplifier 31 for amplification. The amplified voltage waveform is then digitized by the digital oscilloscope 35 to provide a measurement of the output voltage $e_{PT}$, after which it is transferred by way of the IEEE interface 39 to the microcomputer 37.

Next, referring to FIG. 3, the hydrophone H and its hanger 14 are replaced in the framework 12 and positioned so that the hydrophone H faces towards the reciprocal transducer T. The amplified signal from the power amplifier 27 is now applied by way of the impedancematching transformer 29 to the reciprocal transducer T to drive the reciprocal transducer T by another input current $i_T$ at the desired frequency $f = \omega/2\pi$.

The output voltage $e_{TH}$ produced by the hydrophone H with the reciprocal transducer T being driven by the input current $i_T$ is fed by way of the switch 33 to the preamplifier 31 for amplification. The amplified voltage waveform is then digitized by the digital oscilloscope 35 to provide a measurement of the output voltage $e_{TH}$, after which it is transferred by way of the IEEE interface 39 to the microcomputer 37.

Finally, referring to FIG. 4, the current $i_T$ into the reciprocal transducer T is monitored by means of the current transformer 30 and fed by way of the switch 33 to the preamplifier 31 for amplification. The amplified current waveform is then digitized by the digital oscilloscope 35 to provide a measurement of the input current $i_T$, after which it is transferred by way of the IEEE interface 39 to the microcomputer 37.

The microcomputer 37 then uses a conventional discrete Fourier transform to determine the amplitude and phase angles of the components of the measured output voltages $e_{PH}$, $e_{PT}$, $e_{TH}$ and input current $i_T$ at the desired frequency $f = \omega/2\pi$. After all of the required values have been obtained, the microcomputer then calculates the amplitude and phase angle of the receiving sensitivity $M_H$ of the hydrophone at the desired frequency by substitution of the values into the expression $$M_H = [(4\pi e_{PH} e_{TH} d_1 d_3)/(j\omega \rho e_{PT} i_T d_2)]^{\frac{1}{2}}$$

It is important to note that the settings of the preamplifier 31 are left unchanged for all measurements of voltage and current to prevent the introduction of phase and amplitude errors in the calculation of the receiving sensitivity $M_H$.

This procedure yields the phase angle relative to the axis of rotation of the hydrophone hanger 14. Because of this and the presence of interference from unavoidable reflections from the hydrophone hanger, the hydrophone H should be calibrated in the same hanger that will later support it when it is being used for measurements. The calibration is representative of both the hydrophone H and the hanger 14.

Attached as an Appendix is a listing of the source program stored in the microcomputer 37. The program controls (1) the digitization of the amplified output voltages and input current, (2) the transfer of the digital data to the microcomputer, (3) the analysis of data using the discrete Fourier transform to obtain the amplitude and phase angle of the components of the measured output voltages and input current at the desired frequency $f = \omega/2\pi$, and (4) the calculation of the receiving sensitivity $M_H$ of the hydrophone H at the desired frequency $f = 10^7 /2\pi$. All of the instructions in the source program are in BASIC TM.

Figure 5:
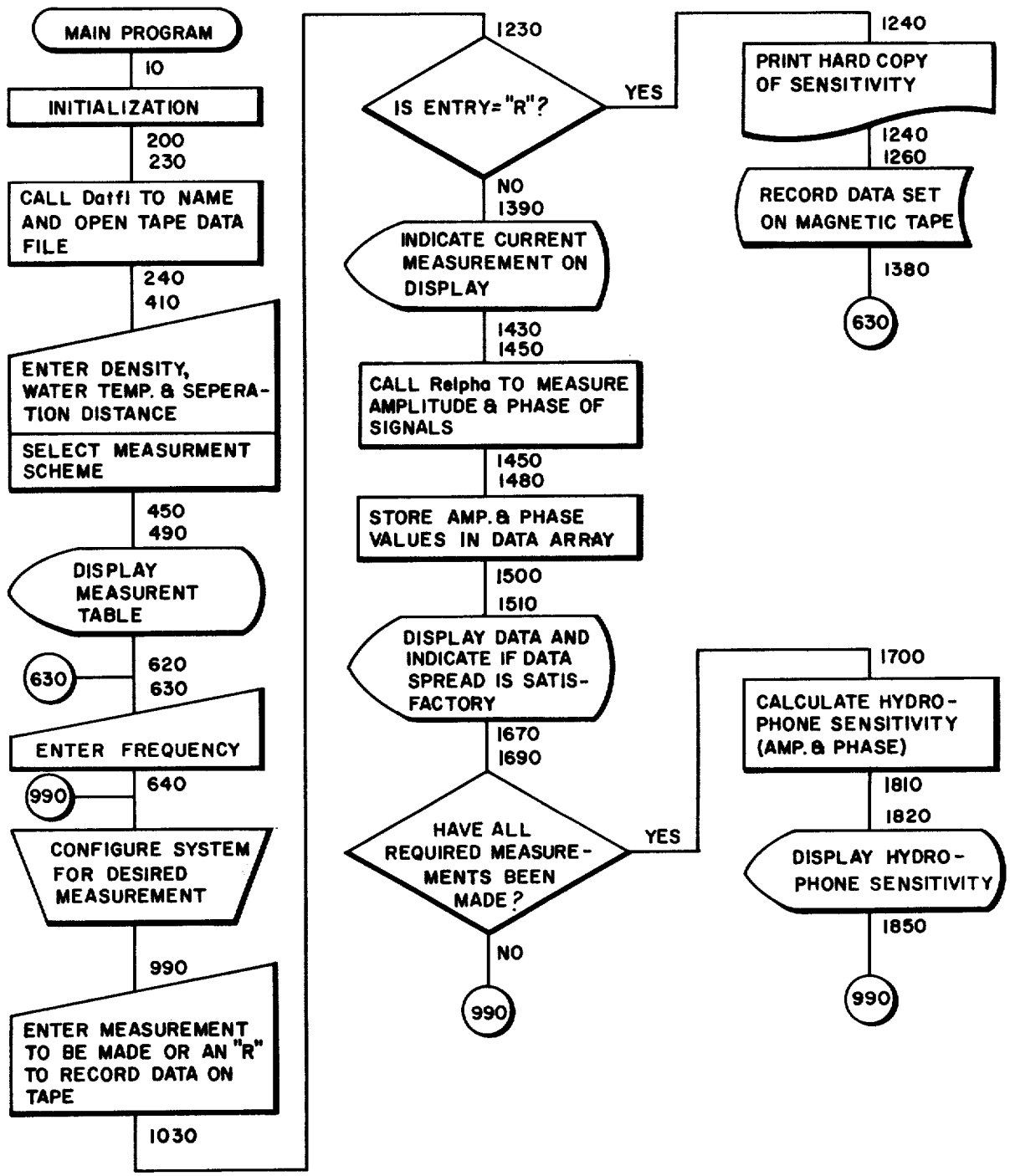
FIGS. 5–7 are flow charts of a program stored in the microcomputer to implement the invention.
Figures 6, 7:
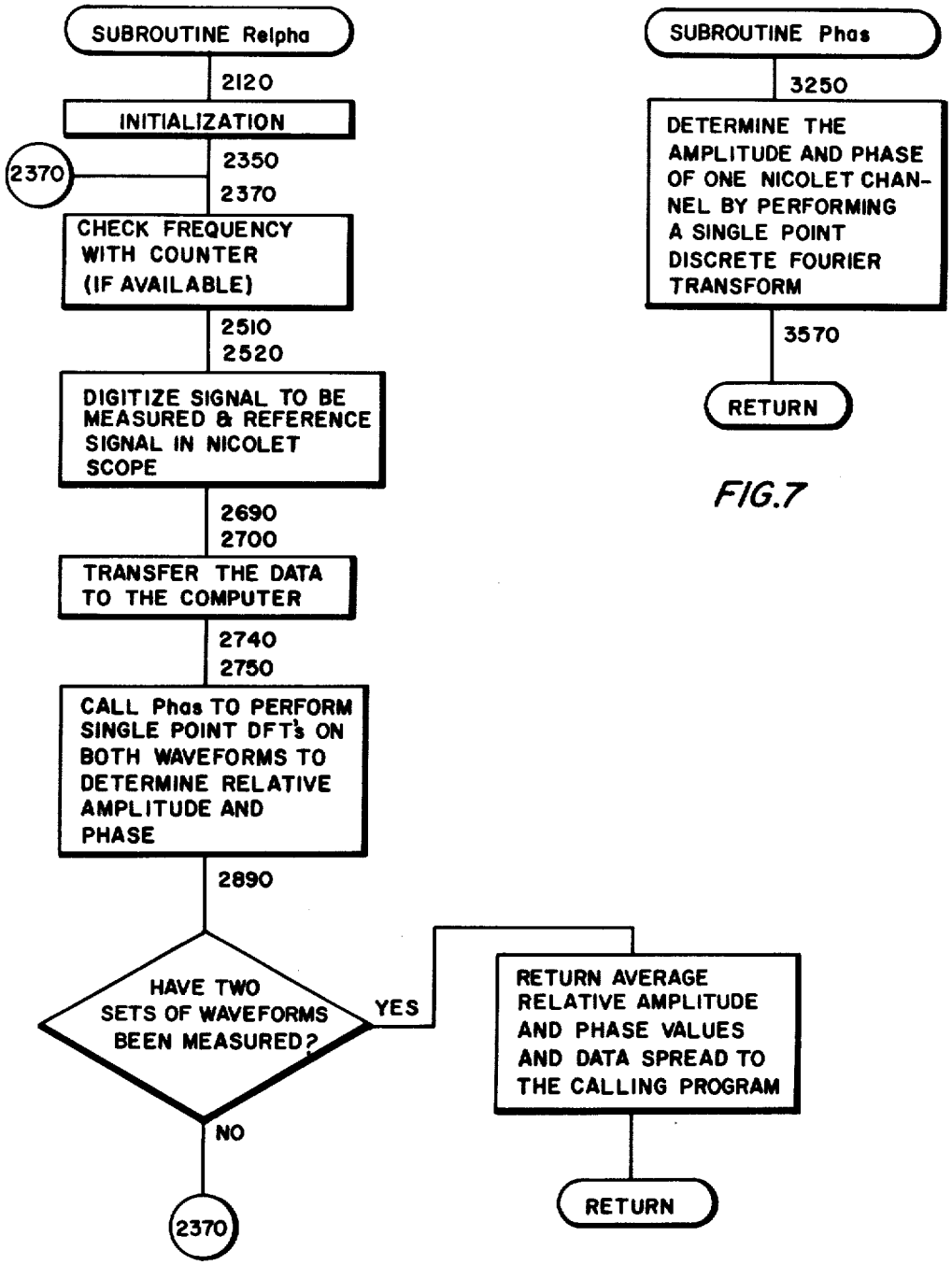

FIGS. 5–7 are flow charts of the source program.

Obviously, numerous modifications and variations of the present invention are possible in light of the above teachings. For example, if the hydrophone H being calibrated has front-to-back symmetry, a modified procedure slightly different from that described above may be used. The modification involves measuring $e_{TH}$ with the hydrophone H facing toward the projector P instead of toward the reciprocal transducer T. The received voltage $e_{TH}$ is then the result of a sound wave incident from the backside of the hydrophone H. In this case the phase angle of $e_{TH}$ combines with that of $e_{PH}$ in the expression for $M_H$ to produce a resultant phase angle for $M_H$ which is relative to the center of the hydrophone H rather than to the axis for rotation. It is therefore to be understood that within the scope of the appended claims, the invention may be practiced otherwise than as specifically described herein.

```
10     ! RECIPROCITY CALIBRATION WITH PHASE.
20     ! THIS PROGRAM PREFORMS THE REQUIRED AMPLITUDE AND PHASE MEASUREMENTS.
30     ! FOR THREE TRANSDUCERS RECIPROCITY CALIBRATION USING THE IN-LINE RIGGING.
40    ·! ALL THE REQUIRED MEASUREMENTS AT EACH FREQUENCY MAY BE MADE TOGETHER
50     ! OR SEVERAL DIFFERENT FREQUENCY MEASUREMENTS FOR EACH TRANSDUCER SETUP
60     ! MAY BE MADE TOGETHER AS DESIRED.
70     ! TWO SEPERATE WAVEFORM SAMPLES ARE AVERAGED FOR EACH MEASUREMENT.
80     ! MEASURED DATA ARE STORED ON TAPE FOR LATER USE IF DESIRED.
90     ! L. D. LUKER    6/9/80
100    OPTION BASE 1
110    DIM Freq(21),Amp(21,5),Pha(21,5),Type$(20)     ! ALL ARRAYS START WITH 1
120    DATA 1000,25,1,50000,10000,100000              ! INITIAL VALUES
130    READ Rho,Temp,Dist,Fs,F1,Ff                    !  '
140    Type$="1 P 1 T e THe PHe PT"
150    Ctr=0                                          ! COUNTER ADDR.>0 TO USE COUNTER
160    Nf=20                                          ! MAX NO. OF FREQUENCIES ALLOWED
170    Strtim=1.50E-4                                 ! SAMPLE START TIME IN s
180    Npts=200                                       ! NO. OF POINTS/CHAN TO SAMPLE
190    Dg$=CHR$(179)
200    PRINT CHR$(27)&"m"
210    PRINT PAGE;
220    PRINT TAB(22);"<< RECIPROCITY PHASE CALIBRATION >>",LIN(1)
230    Filnam$="TSTDAT"                               ! DEFAULT DATA FILE NAME
240    CALL Datfl(Filnam$,#1,1,900,Reply$)            ! CALL SUB TO OPEN DATA FILE
250    S=1
260    F$=""
```

```
270   IF Reply$<>"Y" THEN 410
280   READ #1,Rho,Temp,Dist                     ! READ STORED VALUES
290   IF (TYP(-1)=3) OR (TYP(-1)=4) THEN 360    !       "
300   READ #1;Freq(S)                           !       "
310   FOR I=1 TO 5                              !       "
320      READ #1,Amp(S,I),Pha(S,I)              !       "
330   NEXT I                                    !       "
340   S=S+1
350   GOTO 290
360   Ns=S-1
370   Fs=Freq(1)
380   Fi=Freq(2)-Freq(1)
390   Ff=Fs+S*Fi
400   GOTO 460
410   CALL Entry("DENSITY (kg/m3)",Rho,1)       ! ENTER PARAMETERS
420   CALL Entry("WATER TEMP. ("&Dg$&"C)",Temp,1)!       "
430   CALL Entry("DISTANCE (m)",Dist,1)         !       "
440   PRINT #1;Rho,Temp,Dist
450   INPUT "DO YOU WANT TO CHANGE FREQUENCIES BEFOR SET-UPS?",F$
460   PRINT CHR$(27)&"m"
470   PRINT PAGE
480   C=1403+5*Temp-.06*Temp^2+.0003*Temp^3     ! CALC. SOUND SPEED
490   PRINT "DENSITY=";DROUND(Rho,4);"kg/m3    WATER TEMP.=";DROUND(Temp,3);Dg$;"C
";
500   PRINT "   DISTANCE=";DROUND(Dist,4);"m   C=";DROUND(C,4);"m/s",LIN(1)
510   IF F$<>"Y" THEN 570
520   PRINT "MEASUREMENTS: ";
530   FOR I=1 TO 5
540      PRINT USING "#,K,D,K,K,K,X";"#",I,"=",Type$((I-1)*4+1,4),"  "
550   NEXT I
560   PRINT LIN(1)
570   PRINT "MEASUREMENTS MAY BE MADE IN ANY ORDER. ONLY #2 THROUGH #5 ARE REQUIR
ED."
580   PRINT "ENTER [R] FOR MEASUREMENT NUMBER TO RECORD THIS MEASUREMENT SET.",LI
N(1)
590   PRINT "MEASUREMENT";TAB(17);"FREQUENCY";TAB(31);"AMP RATIO";TAB(45);
600   PRINT "REL PHA";TAB(57);"AMP RANGE";TAB(71);"PHA RANGE";
610   S=1
620   PRINT CHR$(27)&"1"
630   IF F$="Y" THEN 760
640   IF (Ctr<=0) AND (Reply$<>"Y") THEN CALL Entry("FREQUENCY (kHz)",Freq,1000)
650   FOR I=1 TO 5
660      PRINT USING "#,K";CHR$(27)&"&a1c"&VAL$(I*2+6)&"Y"
670      PRINT USING "A,D,2X,K";"#",I,Type$((I-1)*4+1,4)
680      IF Reply$<>"Y" THEN 710
690      PRINT USING "#,K";CHR$(27)&"&a12c"&VAL$(I*2+6)&"Y"
700      PRINT USING 1640;Freq(S)/1000,Amp(S,I),Pha(S,I)
710   NEXT I
720   PRINT USING "#,K";CHR$(27)&"&a0c18Y"
730   IF Reply$="Y" THEN 1710
740   S=1
750   IF F$<>"Y" THEN 980
760   CALL Entry("START FREQ. (kHz)",Fs,1000)
770   CALL Entry("INCREMENT (kHz)",Fi,1000)
780   CALL Entry("FINAL FREQ. (kHz)",Ff,1000)
790   Ns=(Ff-Fs)/Fi+1
800   IF Ns>21 THEN 760
810   Mn=2
820   Fbs=Fs
830   GOTO 920
840   Freq=Fbs-Fi
850   Freq=Freq+Fi
860   IF (Freq<=Ff) AND (Freq<=Fbs+(Nf-1)*Fi) THEN 900
870   WAIT 100
880   BEEP
890   GOTO 990
900   CALL Entry("FREQUENCY (kHz)",Freq,1000)
910   IF Freq>0 THEN 950
920   CALL Entry("BATCH START FREQ.(kHz)",Fbs,1000)
930   CALL Entry("FREQUENCIES PER BATCH",Nf,1)
940   GOTO 1010
950   S=(Freq-Fs)/Fi+1
960   PRINT USING "+,K,D,2X,4A,6X,3D,K";" #",Mn,Type$((Mn-1)*4+1,4),Freq/1000," k
Hz"
970   GOTO 1440
980   Mn=1
990   Mn=Mn+1
1000  IF Mn=6 THEN Mn=2
1010  Mn$=VAL$(Mn)
1020  DISP "DEFAULT MEASUREMENT # =";Mn;
1030  INPUT "    ENTER NEW MEASUREMENT # OR AN R.",Mn$
1040  IF (F$="Y") AND (Mn$="0") THEN 920
1050  IF Mn$<>"P" THEN 1080
1060  GOSUB Prt                                         ! PRINT HARD COPY
```

```
1070 GOTO 1019
1080 IF (Mn$<>"R") OR (F$<>"Y") THEN 1180
1090 FOR I=1 TO Ns                                    ! WRITE DATA TO TAPE
1100     PRINT #1;Freq(I)                             !     •
1110     FOR J=1 TO 5                                 !     •
1120         PRINT #1;Amp(I,J),Pha(I,J)               !     •
1130     NEXT J                                       !     •
1140 NEXT I                                           !     •
1150 READ #1,1                                        ! RE-POSITION TAPE
1160 Reply$="Y"
1170 GOTO 250
1180 IF (Mn$="+") OR (Mn$="-") THEN Mn$[2]="180"! CORRECT FOR PHASE AMBIGUITY
1190 IF (Mn$[1,1]<>"+") AND (Mn$[1,1]<>"-") THEN 1230 !   •
1200 Mhpha=Mhpha+VAL(Mn$)                             !     •
1210 Mn=Mn-1
1220 GOTO 1820
1230 IF Mn$<>"R" THEN 1390
1240 GOSUB Prt
1250 IF Reply$="Y" THEN 1310
1260 PRINT #1;Freq(S)                                 ! WRITE DATA TO TAPE
1270 FOR I=1 TO 5                                     !     •
1280     PRINT #1;Amp(S,I),Pha(S,I)                   !     •
1290     Amp(S,I)=Pha(S,I)=0                          !     •
1300 NEXT I                                           !     •
1310 IF (Reply$="Y") AND (S>=Ns) THEN 240
1320 PRINT USING "#,K";CHR$(27)&"&a0c19Y",CHR$(27)&"J"
1330 S=S+1
1340 FOR I=1 TO 13
1350     PRINT USING "#,K";CHR$(27)&"S"
1360 NEXT I
1370 PRINT USING "#,K";CHR$(27)&"&a0c7Y"
1380 GOTO 630
1390 Mn=VAL(Mn$)
1400 IF (Mn<1) OR (Mn>5) THEN 1020
1410 IF F$="Y" THEN 840
1420 PRINT USING "#,K";CHR$(27)&"&a12c"&VAL$(Mn*2+6)&"Y","<"
1430 IF Ctr<>0 THEN Freq=0
1440 Amp=0
1450 CALL Relpha(2,Freq,Strtim,Npts,Amp,Pha,Aerr,Perr)! CALC. REL. AMP & PHA
1460 Pha=-Pha
1470 IF (F$="Y") AND (Amp=0) THEN 900
1480 Freq(S)=Freq
1490 Amp(S,Mn)=Amp
1500 Pha(S,Mn)=Pha
1510 Er$=" "
1520 IF (ABS(Perr)<1) AND (ABS(Aerr/Amp)<.01) THEN 1580
1530 FOR I=1 TO 4                                     ! OUT OF TOLERANCE WARNING
1540     BEEP                                         !     •
1550     WAIT 100                                     !     •
1560 NEXT I                                           !     •
1570 Er$="*"                                          !     •
1580 BEEP
1590 IF F$<>"Y" THEN 1620
1600 PRINT USING "#,K,D,2X,4A,3X","  #",Mn,Type$[(Mn-1)*4+1,4]
1610 GOTO 1630
1620 PRINT USING "#,K";CHR$(27)&"&a12c"&VAL$(Mn*2+6)&"Y"
1630 PRINT USING 1640;Freq/1000,Amp,Pha,Dg$,Aerr/Amp*100,CHR$(37),Perr,Dg$,Er$
1640 IMAGE 3X,3D," kHz",4X,3D.4D,4X,4D.D,K,3X,3D.2D,X,K,4X,4D.2D,K,3X,K
1650 BEEP
1660 IF (Er$<>" ") AND (F$=Y) THEN Freq=Freq-Fi
1670 IF (Er$<>" ") AND (F$<>"Y") THEN Mn=Mn-1
1680 IF F$="Y" THEN 850
1690 IF (Amp(S,2)=0) OR (Amp(S,3)=0) OR (Amp(S,4)=0) OR (Amp(S,5)=0) THEN 990
1700 ! CALC. SENSITIVITY OF H
1710 Mhamp=SQR(Dist*Amp(S,4)*Amp(S,3)/(Rho*Freq(S)*Amp(S,5)*Amp(S,2)*10))
1720 Mhpha=Pha(S,4)+Pha(S,3)-Pha(S,5)-Pha(S,2)-90
1730 ! CALC. SENSITIVITY OF T
1740 Mt=20*LGT(Mhamp*Amp(S,5)*2/Amp(S,4))-120
1750 IF Amp(S,1)<=0 THEN 1790
1760 ! CALC. SENSITIVITY OF P
1770 Mp=20*LGT(Mhamp*2*Amp(S,5)*Amp(S,2)/(Amp(S,3)*Amp(S,1)))-120
1780 ! CORRECT PHASE RANGE
1790 Mhpha=Mhpha MOD 360                              ! -360<PHASE<360
1800 IF Mhpha<0 THEN Mhpha=Mhpha+360                  ! 0<=PHASE<360
1810 Mhpha=Mhpha/2                                    ! SQUARE ROOT OF PHASE
1820 PRINT USING "#,K";CHR$(27)&"&a0c18Y"
1830 PRINT USING 1840;20*LGT(Mhamp)-120,Mhpha,"MT=",Mt,"MP=",Mp
1840 IMAGE "MH= ",4D.D," dB AT ",4D.D," DEGREES.",2(5X,K,X4D.D," dB")
1850 IF Reply$<>"Y" THEN 990
1860 Mn$=""
1870 INPUT "PRESS [CONTINUE] FOR NEXT DATA SET.",Mn$
1880 IF Mn$="N" THEN 1310
1890 IF (Mn$[1,1]="+") OR (Mn$[1,1]="-") THEN 1180 ! CORRECT PHASE FOR AMBIGUITY
1900 IF Mn$<>"P" THEN 1930
```

```
1910 GOSUB Prt
1920 GOTO 1860
1930 IF Mn$="" THEN 1240
1940 Mn=VAL(Mn$)
1950 S=(Mn*1000-Fs)/Fi
1960 GOTO 1310
1970 ! SUBROUTINES  ****************************************
1980 !
1990 Prt: OUTPUT 0 USING "3D,X,4D.D,4D.D";Freq(S)/1000,20*LGT(Mhamp)-120,Mhpha
2000 OUTPUT 0 USING "3X,K,4D.D","MT=",Mt
2010 RETURN
2020 !
2030 SUB Entry(Id$,Valu,Mult)                    ! SSSSSSSSSSSSSSSSSSSSSSSSSSSS
2040 ! ALLOWS EASY ENTRY OF DATA ITEMS.
2050 ! L. D. LUKER    3/5/80
2060 Valu=Valu/Mult
2070 DISP Id$;" =";Valu;"     ENTER NEW ";Id$;" IF DIFFERENT:";
2080 INPUT " ",Valu
2090 Valu=Valu*Mult
2100 SUBEND
2110 !
2120 SUB Relpha(Ntrls,Freq,Strtim,Npts,Aamp,Apha,Ramp,Rpha)! SSSSSSSSSSSSSSSSSS
2130 ! READS TWO WAVEFORMS FROM NICOLET AND DETERMINES REL AMP & REL PHASE
2140 ! CAN READ THE FREQUENCY FROM THE HP-5345A ELECTRONIC COUNTER.
2150 ! DETERMINES THE RATIO OF B/A. CAN AVERAGE SEVERAL TRIALS.
2160 ! INDICATES GATED POINTS DURING MEASUREMENT.
2170 ! REQUIRES SUB Phas.
2180 ! Ntrls=NUMBER OF TRIALS TO AVERAGE.
2190 ! Freq=FREQUENCY (IF Freq=0 DETERMINES FREQUENCY).
2200 ! Strtim=TIME OF THE START OF THE SAMPLE IN s
2210 ! Npts=NUMBER OF POINTS TO SAMPLE PER CHANNEL
2220 ! Aamp=RETURNS AMPLITUDE RATIO OF B/A.
2230 ! Apha=RETURNS RELATIVE PHASE OF B/A.
2240 ! Ramp=RETURNS AMP ERROR.
2250 ! Rpha=RETURNS PHA ERROR.
2260 ! L. D. LUKER    4/14/80
2270 OPTION BASE 1                              ! ALL ARRAYS START WITH 1
2280 N1d=714                                    ! NICOLET DATA ADDRESS
2290 N1c=N1d+1                                  ! NICOLET COMMAND ADDRESS
2300 Ctr=0                                      ! COUNTER ADDR.>0 TO USE COUNTER
2310 DIM X$[8192]                               ! BUFFER ARRAY
2320 INTEGER X(Npts,2)
2330 Tamp=Tpha=0
2340 Mna=Mnp=1E9
2350 Mxa=Mxp=1E-9
2360 FOR Trial=1 TO Ntrls                       ! START TRIAL
2370     IF Ctr=0 THEN 2520                     ! CHECK FOR COUNTER USE
2380     OUTPUT Ctr;"F0G?D0I1E8J1"              ! TELL COUNTER TO READ FREQ.
2390     WAIT 110                               ! GIVE CTR SOME TIME
2400     ENTER Ctr;Cfreq                        ! RECEIVE FREQ. FROM CTR
2410     RESET Ctr                              ! CLEAR CTR
2420     Cfreq=PROUND(Cfreq,3)                  ! ROUND TO NEAREST kHz
2430     IF (Freq=Cfreq) OR (Freq=0) THEN 2510
2440     FOR I=1 TO 4
2450         BEEP
2460         DISP "FREQUENCY DOES NOT MATCH!"
2470         WAIT 200
2480     NEXT I
2490     WAIT 1000
2500     SUBEXIT
2510     Freq=Cfreq
2520     DISP "CONVERTING DATA FOR TRIAL #";Trial
2530     OUTPUT N1c;"H0"                        ! SET NICOLET TO "HOLD NEXT"
2540     STATUS N1d;Stat                        ! READ NICOLET STATUS
2550     IF Stat<>0 THEN 2540                   ! WAIT FOR "HOLD LAST"
2560     RESET N1c                              ! RESET NICOLET
2570     OUTPUT N1c;"N1"                        ! "NORMALIZING DATA"
2580     FOR I=1 TO 2
2590         ENTER N1d USING 2600;A,B,C,D,E,K(I),T! READ NORMALIZING DATA
2600         IMAGE 3(1N),2(5N),2(7N)
2610     NEXT I
2620     Fpt=INT(INT(E/2)+Strtim/T)
2630     OUTPUT N1c;"D1"
2640     OUTPUT N1d;Fpt*2-1                     ! DRAW POINTS FOR GATE
2650     OUTPUT N1d;2047                        !       .
2660     OUTPUT N1d;(Fpt+Npts)*2+1              !       .
2670     OUTPUT N1d;2047                        !       .
2680     OUTPUT N1c;"D1"                        !       .
2690     OUTPUT N1d;Fpt*2
2700     OUTPUT N1c;"D2"                        ! "AUTO-BINARY DATA"
2710     ENTER N1d BFHS Npts*4 NOFORMAT;X$      ! TRANSFER DATA
2720     IF Trial=2 THEN OUTPUT N1c;"L0"
2730     RESET N1c                              ! RESET NICOLET
2740     ENTER X$ USING "#,Y";X(*)              ! PUT DATA IN INTEGER ARRAY
2750     DISP "PROCESSING CHANNEL A"
```

```
2760      CALL Phas(Freq,T,1,K(1),Amp,Pha,Npts,X(*))! DETERMINES AMP & PHA
2770      Ampa=Amp
2780      R18=Pha
2790      DISP "PROCESSING CHANNEL B"
2800      CALL Phas(Freq,T,2,K(2),Amp,Pha,Npts,X(*))
2810      Amp=Amp/Ampa
2820      Phas=Pha-R18                              ! DETERMINE REL. PHASE
2830      IF Phas<0 THEN Phas=Phas+360              ! ELEMINATE NEG. PHASES
2840      Mna=MIN(Mna,Amp)
2850      Mxa=MAX(Mxa,Amp)
2860      Mnp=MIN(Mnp,Phas)
2870      Mxp=MAX(Mxp,Phas)
2880      Tamp=Tamp+Amp
2890      Tpha=Tpha+Phas
2900 NEXT Trial                                     ! END TWO SAMPLE LOOP
2910 Aamp=Tamp/Ntrls                                ! CALC AVE AMP RATIO
2920 Apha=Tpha/Ntrls                                ! CALC AVE PHASE
2930 Ramp=Mxa-Mna                                   ! CALC AMP RANGE
2940 Rpha=Mxp-Mnp                                   ! CALC PHA RANGE
2950 SUBEND
2960 !
2970 SUB Datfl(Filename$,#1,Type,No_items,Read$) !SSSSSSSSSSSSSSSSSSSSSSSSSSSSSS
2980 ! SUBROUTINE TO OPEN A DATA FILE.
2990 ! Filename$=DEFAULT FILE NAME
3000 ! Type=DATA TYPE (1=FULL PREC.  2=SHORT PREC.  3=INTEGER  4=STRING)
3010 ! No_items=MAXIMUM NUMBER OF DATA ITEMS TO BE HANDLED
3020 ! Read$=RETURNS A "Y" IF READING DATA IS DESIRED
3030 ! L. D. LUKER     4/9/80
3040 Read$="N"
3050 INPUT "DO YOU WANT TO READ PREVIOUSLY RECORDED DATA? (Y/N)",Read$
3060 DISP "INSERT THE DATA TAPE AND ENTER THE DATA FILE NAME:";
3070 DISP " (DEFAULT FILE NAME=";Filename$;")";
3080 INPUT " ",Filename$
3090 ASSIGN #1 TO Filename$,Ret
3100 IF Read$="Y" THEN 3180
3110 IF Type<=1 THEN Fl=1+8*No_items/256
3120 IF (Type=2) OR (Type=3) THEN Fl=1+4*No_items/256
3130 IF Type=4 THEN Fl=1+No_items/256
3140 IF Ret=0 THEN 3170
3150 DISP "CREATING A FILE CALLED ";Filename$;"."
3160 CREATE Filename$,Fl
3170 ASSIGN #1 TO Filename$,Ret
3180 IF Ret=0 THEN 3230
3190 BEEP
3200 DISP "I CAN'T FIND A DATA FILE CALLED ";Filename$;"!"
3210 WAIT 3000
3220 GOTO 3060
3230 SUBEND
3240 !
3250 SUB Phas(Freq,T,C,Norm,Amp,Pha,Npts,INTEGER X(*))!SSSSSSSSSSSSSSSSSSSSSSSSS
3260 ! CALCULATES THE AMPLITUDE & PHASE OF ONE NICOLET CHANNEL BY PERFORMING
3270 ! A SINGLE-POINT DFT.
3280 ! Freq=FREQEUNCY IN Hz
3290 ! T=TIME PER POINT IN s
3300 ! C=CHANNEL (1=CHANNEL A    2=CHANNEL B)
3310 ! Norm=VOLTAGE NORMALIZING FACTOR
3320 ! Amp=RETURNS AMPLITUDE IN VOLTS
3330 ! Pha=RETURNS PHASE IN DEGREES
3340 ! Npts=NUMBER OF POINTS TO SAMPLE
3350 ! X()=Npts,2)=INTEGER ARRAY CONTIANING A & B RAW DATA
3360 ! L. D. LUKER    4/4/80
3370 OPTION BASE 1                                  ! ALL ARRAYS START WITH 1
3380 DEG                                            ! DEGREE MODE
3390 F=Freq*T
3400 R1=INT(F*Npts)
3410 R2=INT(R1/F)
3420 R14=R13=R7=R6=0
3430 R8=2*COS(360*R1/R2)
3440 FOR I=1 TO R2
3450      R12=X(I,C)*Norm
3460      R5=R12+R8*R6-R7
3470      R7=R6
3480      R6=R5
3490      R13=R13+R12*R12
3500      R14=R14+R12
3510 NEXT I
3520 R10=(2*R6-R8*R7)/R2                            ! CALC. REAL
3530 R11=2*R7*SIN(360*R1/R2)/R2                     ! CALC. IMAGINARY
3540 R14=R14/R2                                     ! CALC. DC
3550 Amp=SQR(R10*R10+R11*R11)                       ! CALC. AMPLITUDE
3560 Pha=-ATN(R11/R10)-180*(R10<0)*SGN(R11)         ! CALC. PHASE
3570 SUBEND
```

What is claimed as new and desired to be secured by Letters Patent of the United States is:

1. Apparatus for obtaining a frequency calibration of a hydrophone H comprising:

positioning means for positioning the hydrophone H together with a projector P and a reciprocal electroacoustic transducer T along a straight line in a substantially free-field water medium, so that the hydrophone H lies between the projector P and the reciprocal transducer T within their farfields, and the projector P and reciprocal transducer T both face the hydrophone H;

driving means for driving the projector P by one input current $i_P$ at a desired frequency $f=\omega/2\pi$ and for driving the reciprocal transducer T by another input current $i_T$ at the desired frequency $f=\omega/2\pi$;

measuring means for measuring the output voltage $e_{PH}$ of the hydrophone H with the projector P being driven by the input current $i_P$, for measuring the output voltage $e_{PT}$ of the reciprocal transducer T with the hydrophone removed from the positioning means and the projector P being driven by the input current $i_P$, for measuring the output voltage $e_{TH}$ of the hydrophone H with the hydrophone in place in the positioning means and the reciprocal transducer T being driven by the input current $i_T$, and for measuring the input current $i_T$; and computing means connected to the measuring means for determining the amplitude and phase angle of the components of the measured output voltages and input current at the desired frequency $f=\omega/2\pi$, and for calculating therefrom the amplitude and phase angle of the receiving sensitivity $M_H$ of the hydrophone H at the desired frequency $f=\omega/2\pi$ by substitution in the expression $$M_H = [(4\pi e_{PH} e_{TH} d_1 d_3)/(j\omega \rho e_{PT} i_T d_2)]^{1/2}$$

wherein:
$j = \sqrt{-1}$;
$\rho$ = the density of the water medium;
$d_1$ = the distance between the projector P and the hydrophone H;
$d_2$ = the distance between the projector P and the reciprocal transducer T; and
$d_3$ = the distance between the hydrophone H and the reciprocal transducer T.

2. The apparatus recited in claim 1 wherein the positioning means includes:

a framework having a rotatable and removable hanger for mounting the hydrophone H.

3. The apparatus recited in claim 1 wherein the driving means includes:

a frequency synthesizer for generating a continuous wave signal at the desired frequency $f=\omega/2\pi$;

a signal gate connected to the frequency synthesizer and responsive to timing signals from the pulse timing generator for converting the continuous wave signal into a pulsed sinusoid;

a preamplifier connected to the signal gate for preamplifying the pulsed sinusoid; and an amplifier connected to the preamplifier for amplifying the preamplified pulsed sinusoid.

4. The apparatus recited in claim 3 including:

an impedance matching transformer connected to the amplifier.

5. The apparatus recited in claim 1 wherein the measuring means includes:

a current transformer connected to the driving means for monitoring the input current $i_T$;

a preamplifier;

a single pole-double throw switch for connecting the input of the preamplfier to either the current transformer or to one or the other of the hydrophone H and the reciprocal transducer T; and a digital oscilloscope connected to the output of the preamplifier for digitizing an output waveform from the preamplfier.

6. The apparatus recited in claim 1 wherein the computing means includes:

a microcomputer.

7. A method for obtaining a frequency calibration of a hydrophone H comprising the steps of:

positioning the hydrophone H together with a projector P and a reciprocal electroacoustic transducer along a straight line in a substantially free-field water medium, so that the hydrophone H lies between the projector P and the reciprocal transducer T within their farfields, and the projector P and reciprocal transducer T both face the hydrophone H;

driving the projector P by one input current $i_P$ at a desired frequency $f=\omega/2\pi$;

measuring the output voltage $e_{PH}$ of the hydrophone H with the projector P being driven by the input current $i_P$;

measuring the output voltage $e_{PT}$ of the reciprocal transducer T with the hydrophone removed and the projector P being driven by the input current $i_P$;

driving the reciprocal transducer T by another input current $i_T$ at the desired frequency $f=\omega/2\pi$;

measuring the output voltage $e_{TH}$ of the hydrophone H with the hydrophone in place and the reciprocal transducer T being driven by the input current $i_T$;

measuring the input current $i_T$;

determining the amplitude and phase angle of the components of the measured output voltages and input current at the desired frequency $f=\omega/2\pi$; and calculating therefrom the amplitude and phase angle of the receiving sensitivity $M_H$ of the hydrophone at the desired frequency $f=\omega/2\pi$ by substitution in the expression $$M_H = [(4\pi e_{PH} e_{TH} d_1 d_3)/(j\omega \rho e_{PT} i_T d_2)]^{1/2}$$

wherein:
$j = \sqrt{-1}$;
$\rho$ = the density of the water medium;
$d_1$ = the distance between the projector P and the hydrophone H;
$d_2$ = the distance between the projector P and the reciprocal transducer T; and
$d_3$ = the distance between the hydrophone H and the reciprocal transducer T.

8. The method recited in claim 7 wherein the step of driving the projector P includes:

generating a continuous wave signal at the desired frequency $f=\omega/2\pi$;

generating timing signals;

converting the continuous wave signal into a pulsed sinusoid in response to the timing signals;
preamplifying the pulsed sinusoid; and
amplifying the preamplified pulsed sinusoid.

9. The method recited in claim 7 wherein the step of measuring the output voltage $e_{PH}$ includes:
preamplifying the output voltage; and
digitizing the preamplified output voltage.

10. The method recited in claim 7 wherein the step of measuring the input current $i_T$ includes:
monitoring the input current $i_T$ with a current transformer;
preamplifying the monitored input current $i_T$; and
digitizing the preamplified monitored input current $i_T$.

* * * * *